(12) United States Patent
Chosokabe et al.

(10) Patent No.: US 7,232,527 B2
(45) Date of Patent: Jun. 19, 2007

(54) SINTERED BODY FOR THERMISTOR DEVICES, THERMISTOR DEVICE AND TEMPERATURE SENSOR

(75) Inventors: Takaaki Chosokabe, Ichinomiya (JP); Masaki Iwaya, Gifu (JP); Naoki Yamada, Iwakura (JP)

(73) Assignee: NGK Spark Plug Co., Ltd., Aichi (JP)

(*) Notice: Subject to any disclaimer, the term of this patent is extended or adjusted under 35 U.S.C. 154(b) by 456 days.

(21) Appl. No.: 10/724,253

(22) Filed: Dec. 1, 2003

(65) Prior Publication Data
US 2004/0159825 A1   Aug. 19, 2004

(30) Foreign Application Priority Data
Nov. 29, 2002 (JP) .................... P. 2002-347601

(51) Int. Cl.
| | |
|---|---|
| H01B 1/08 | (2006.01) |
| H01C 7/10 | (2006.01) |
| H01C 7/23 | (2006.01) |
| C04B 35/00 | (2006.01) |
| C04B 35/50 | (2006.01) |

(52) U.S. Cl. .................... 252/62.3 BT; 252/62.3 T; 252/62.2; 252/500; 252/518.1; 252/521.3; 338/22 R; 338/22 SD; 501/123; 501/127; 501/139; 501/152; 423/599; 423/594.1; 423/594.16; 423/600

(58) Field of Classification Search ............. 252/62.2, 252/62.3, 301.4, 500, 518.1, 521, 62.3 T, 252/62.3 BT; 338/22 R, 22 SD, 225; 501/123, 501/127, 139, 151, 152; 429/27, 30, 45, 429/218.1, 224; 502/525; 423/594.16, 599, 423/594.1, 600
See application file for complete search history.

(56) References Cited

U.S. PATENT DOCUMENTS

| | | | |
|---|---|---|---|
| 5,403,461 A * | 4/1995 | Tuller et al. ................ 204/252 |
| 5,432,024 A * | 7/1995 | Soma et al. ................ 429/44 |
| 5,489,483 A * | 2/1996 | Soma et al. ................ 429/27 |
| 6,878,304 B2 * | 4/2005 | Ogata et al. ............. 252/518.1 |

FOREIGN PATENT DOCUMENTS

| | | |
|---|---|---|
| EP | 0 626 356 A1 | 11/1994 |
| FR | 1.338.927 | 10/1963 |
| JP | 56-32701 | 4/1981 |

OTHER PUBLICATIONS

European Search Report for EP 03 25 7495 dated Sep. 16, 2004.
* cited by examiner

*Primary Examiner*—Mark Kopec
*Assistant Examiner*—Kallambella Vijayakumar
(74) *Attorney, Agent, or Firm*—Sughrue Mion, PLLC

(57) ABSTRACT

A sintered body for thermistor device comprising: at least one element selected from elements of group 3 in a periodic table proviso that La is excluded; at least one element selected from elements of group 2 in a periodic table; Mn; Al; and oxygen, and being substantially free from any transition metal other than Mn and the at least one element selected from elements of group 3 in the periodic table.

9 Claims, 2 Drawing Sheets

SINTERED BODY FOR THERMISTOR DEVICES, THERMISTOR DEVICE AND TEMPERATURE SENSOR

FIELD OF THE INVENTION

This invention relates to a sintered body for thermistor devices, a thermistor device and a temperature sensor. More specifically, it relates to a sintered body for thermistor devices which makes it possible to provide a thermistor device capable of detecting temperature over a wide temperature range from low temperature to high temperature and showing little change in electrical resistance to a heat profile and a temperature sensor with the use of this thermistor device.

BACKGROUND OF THE INVENTION

A thermistor is a sintered body made up of specific metal oxides which shows a change in electrical resistance depending on temperature change. Thermistor devices comprising this sintered body and a pair of electrode have been widely employed in detecting temperature in various fields, for example, the temperature of integrated circuits, the temperature of automotive gas emissions, the flame temperature of gas water heaters and so on.

It is required that a sintered body for thermistor devices employed in these thermistor devices for detecting temperature shows (1) a small constant B, (2) a small change in resistance to a heat profile, and (3) a little scatter in resistance. The constant B as used herein is a constant serving as an indication of a change in electrical resistance. A smaller constant B means the smaller change in electrical resistance depending on temperature change. A thermistor device (a sintered body for thermistor devices) satisfying the performance requirements as described above has a wide detection temperature range, a favorable heat resistance and a high temperature detection accuracy.

As such a sintered boy for thermistor devices, there has been known one comprising (Y, Sr) (Cr, Fe, Ti)$O_3$ as the main component (see JP-A-7-201526). This sintered body for thermistor devices shows electrical resistances of about 100 k$\Omega$ and about 80 k$\Omega$ respectively at 300° C. and 900° C. It is an excellent sintered body for thermistor devices which has a constant B of about 8000 K at 300 to 900° C. and remains stable to a heat profile within a temperature range of from 300 to 1000° C. There have been also known a sintered body for thermistor devices comprising Y (Cr, Mn) $O_3$+$Y_2O_3$ as the main component (see JP-A-2002-124403) and a sintered body for thermistor devices comprising (Y, Ca) $CrO_3$+0.5$YAlO_3$ as the main component (see JP-A-6-338402).

SUMMARY OF THE INVENTION

In the sintered body for thermistor devices described in Patent Document 1, however, the constant B is liable to be elevated because of Ti contained therein. Consequently, it suffers from a problem that the electrical resistance attains the insulation resistance level of M$\Omega$ at a temperature of 300° C. or lower and thus temperature in the low temperature range cannot be detected.

The electrical resistance of the above-described sintered body for thermistor devices can be controlled by changing the composition. For example, the electrical resistance at 100° C. can be regulated to 500$\Omega$ or below so that it can detect a temperature around 100° C. However, this sintered body for thermistor devices suffers from another problem that the stability in its resistance temperature properties is frequently worsened by a heat profile wherein it is exposed to high temperature of about 1000° C. repeatedly or continuously for a long time.

The sintered bodies for thermistor devices shown in Patent Documents 1 to 3 contain Cr which is a highly volatile element. As a result, there arises another problem that the resistance temperature properties of the devices are liable to vary depending on the volatilization amount of Cr.

A problem that the invention is to solve is to provide a sintered body for thermistor devices, by which the above-described troubles occurring in the related art can solved and which can provide a thermistor device capable of detecting temperature over a wide temperature range of from low temperature of 100° C. or below to high temperature of around 900° C. and showing little change in electrical resistance to a high heat profile, a thermistor device having this sintered body for thermistor devices and a temperature sensor with the use of this thermistor device.

To solve the above-described problem, the inventors have conducted intensive studies on the elemental components constituting a sintered body for thermistor devices. As a result, they have found out that a sintered body for thermistor devices containing at least one element selected from the group 3 (excluding La) in the periodic table, at least one element selected from the group 2 in the periodic table, Mn, Al and oxygen and being substantially free from any transition metal other than Mn and the at least one element selected from the group 3 in the periodic table is capable of providing a thermistor device which can detects temperature over a wide temperature range of from low temperature to high temperature and shows little change in electrical resistance to a high heat profile. The invention has been completed based on this finding.

Accordingly, the first means for solving the above-described problem of the invention is:

(a) a sintered body for thermistor devices characterized by containing at least one element selected from the group 3 (excluding La) in the periodic table, at least one element selected from the group 2 in the periodic table, Mn, Al and oxygen and being substantially free from any transition metal other than Mn and the at least one element selected from the group 3 in the periodic table.

As a preferred embodiment in this first means, the following one can be cited:

1) a sintered body for thermistor devices as described in the above (a) which satisfies the following formulae (1) and (2):

$$0.02 \leq a < 1 \quad (1)$$

$$b+c=1 \quad (2)$$

provided that the content of the at least one element selected from the group 3 (excluding La) in the periodic table is referred to 1-a (mol); the content of the at least one element selected from the group 2 in the periodic table is referred to as a (mol); the content of Mn is referred to as b (mol); and the content of Al is referred to as c (mol).

In this embodiment, it is preferable that the content b (mol) of Mn satisfies the following formula: $0.10 \leq b \leq 0.30$.

As another preferred embodiment in this first means, the following one can be cited:

2) a sintered body for thermistor devices as described in the above (a), wherein the at least one element selected from the group 3 (excluding La) in the periodic table is Y, Sc, Ce, Nd, Sm, Eu, Gd, Dy, Er or Yb and the at least one element selected from the group 2 in the periodic table is Ca, Sr, Mg or Ba.

As another preferred embodiment in this first means, the following one can be cited:

3) a sintered body for thermistor devices as described in the above (a) which contains Si element.

The second means for solving the above-described problem of the invention is:

(b) a thermistor device characterized by being provided with a sintered body for thermistor devices as described in the above (a) and a pair of electrode leads which is embedded in the sintered body for thermistor devices and at least one end of which is drawn out to take an output signal.

Further, the third means for solving the above-described problems of the invention is:

(c) a temperature sensor characterized by using the thermistor device as described in the above (b).

Figure 1:
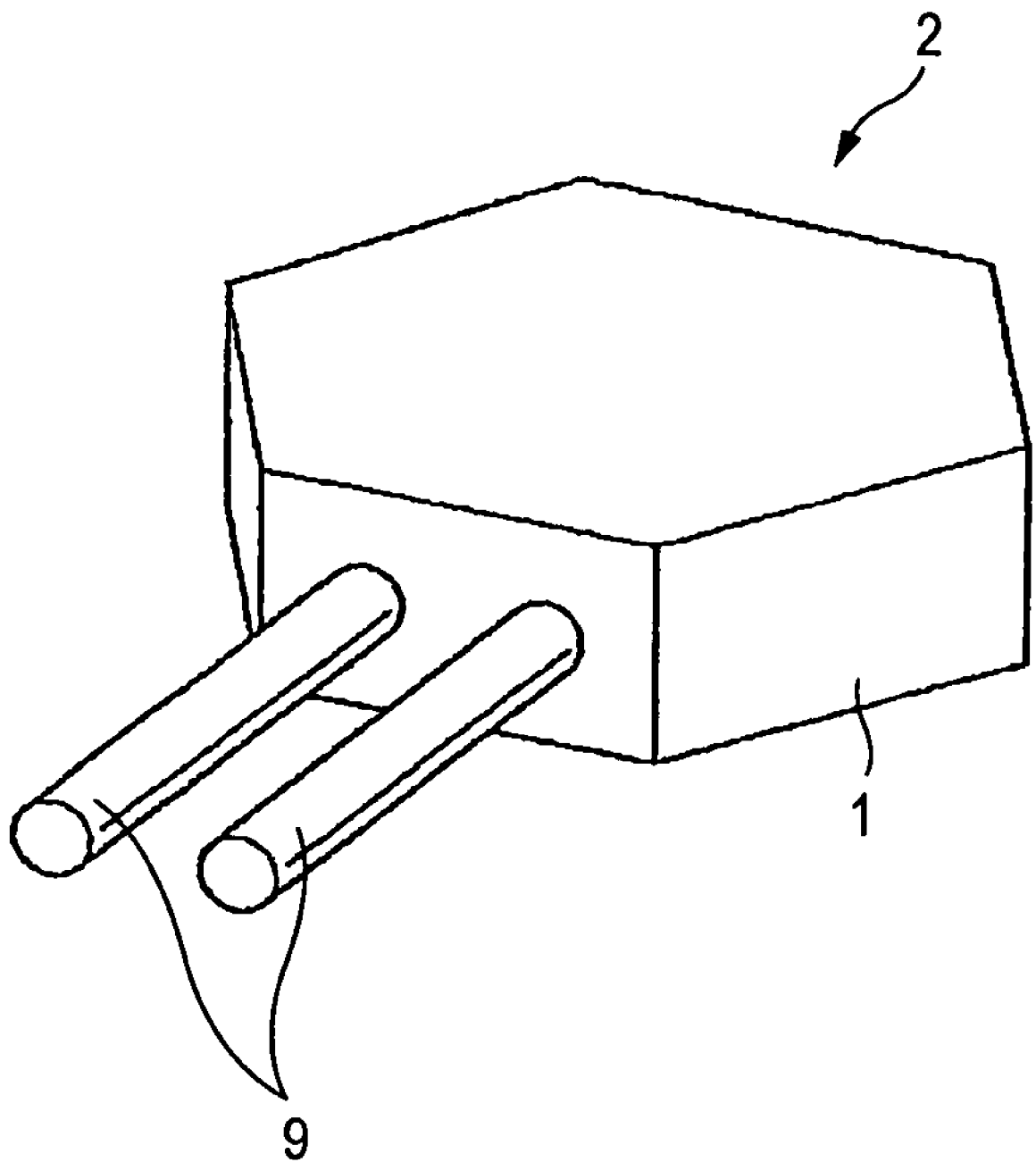
FIG. 1 is a perspective view of the appearance of a thermistor device using the sintered body for thermistor devices according to the invention.

DESCRIPTION OF REFERENCE NUMERICALS 1 sintered body for thermistor devices
2 thermistor device
3 metal tube
4 flange
5 nut
6 joint
7 sheath core wire
8 sheath
9 electrode lead
100 temperature sensor

DETAILED DESCRIPTION OF THE INVENTION

The sintered body for thermistor devices according to the invention first contains at least one element selected from the group 3 in the periodic table. However, La is excluded therefrom. This is because, in the case where unreacted La oxide remains in the sintered body for thermistor devices, the unreacted compound reacts with moisture in the atmosphere to form $La(OH)_3$ which induces some troubles such as cracking in thermistor devices (sintered body for thermistor devices) and unstabilization of resistance. Two or more of these elements may be contained.

The term "periodic table" means the periodic table recommended by IUPAC in 1990 (*MukikagakuMeimeiho— IUPAC1990—nen Kankoka-*, edited by G. L. LEICH, translated by KAZUO YAMAZAKI, p. 43, first impression of the first edition, published on Mar. 26, 1993, Tokyo Kagaku Dojin).

The sintered body for thermistor devices according to the invention contains at least one element selected from the group 2 in the periodic table. Two or more of these elements may be contained therein. The term "periodic table" has the same meaning as described above.

It should be noted that the sintered body for thermistor devices according to the invention contains Mn, Al and oxygen but is free from any transition metal other than Mn and the at least one element selected from the group 3 in the periodic table. This is because the presence of a transition metal (for example, Fe, Co, Ni or Ti) other than Mn and the at least one element selected from the group 3 in the periodic table, if any, would enlarge the constant B. Although it is desirable that the sintered body for thermistor devices is free from any transition metal other than Mn and the at least one element selected from the group 3 in the periodic table as described above, it is sometimes unavoidable that the sintered body for thermistor devices contains such a transition metal which is contained as impurities in an extremely small amount in a material employed in the (industrial) production thereof or due to contamination during the production. In the description of the invention, therefore, it is defined that the sintered body for thermistor devices is substantially free from any transition metal other than Mn and the at least one element selected from the group 3 in the periodic table in the case where neither Mn nor the at least one element selected from the group 3 in the periodic table is detected by measuring, for example, under a scanning electron microscope Model JED-2110 (manufactured by JEOL) at an acceleration voltage of 20 kV.

Further, it is preferable that the sintered body for thermistor devices according to the invention is a sintered body for thermistor devices which satisfies the following formulae (1) and (2):

$$0.02 \leq a < 1 \quad (1)$$

$$b + c = 1 \quad (2)$$

provided that the content of the at least one element selected from the group 3 (excluding La) in the periodic table is referred to 1-a (mol); the content of the at least one element selected from the group 2 in the periodic table is referred to as a (mol); the content of Mn is referred to as b (mol); and the content of Al is referred to as c (mol).

By controlling the content a (mol) of the at least one element selected from the group 2 in the periodic table so that it satisfies the formula $0.02 \leq a < 1$, it becomes possible to make the sintered body for thermistor devices stable to a heat profile and to achieve favorable properties of the constant B. It is undesirable that the content a (mol) of the at least one element selected from the group 2 in the periodic table is less than 0.02, since the sintered body for thermistor devices sometimes shows unstable properties to a heat profile in this case.

It is also preferable that the content b (mol) of Mn satisfies the formula $0.10 \leq b \leq 0.30$. By controlling the content of Mn within this range, a favorable temperature detection performance can be established over a wide temperature range from low temperature (100° C. or lower) to high temperature (900° C.). A still preferable temperature detection performance can be established by controlling the content b (mol) of Mn within the range $0.14 \leq b \leq 0.26$.

In the sintered body for thermistor devices according to the invention, it is still preferable that the at least one element selected from the group 3 (excluding La) in the periodic table is Y, Se, Ce, Nd, Sm, Su, Gd, Dy, Er or Yb and, among all, Y is the most desirable element therefor. Also, it is preferable that the at least one element selected from the group 2 in the periodic table is Ca, Sr, Mg or Ba and, among all, Ca is the most desirable element therefor. In the most desirable case of the sintered body for thermistor devices according to the invention, the element selected from the group 3 (excluding La) in the periodic table as described above is Y while the element selected from the group 2 in the periodic table as described above is Ca. This is because, by selecting Y and Ca as described above, a sintered body for thermistor devices having an elevated stability to a heat profile and a smaller constant B can be provided.

It is still preferable that the sintered body for thermistor devices according to the invention contains Si element, since use of the Si element makes it possible not only to obtain a sintered body for thermistor devices by sintering at a lower temperature but also to enhance the strength of the obtained sintered body.

As discussed above, the invention provides a sintered body for thermistor devices being substantially free from any transition metal other than Mn and the at least one element selected from the group 3 in the periodic table. Owing to this construction, the invention can provide a sintered body for thermistor devices whereby the existing problem of occurring a large scatter in resistance caused by the volatilization amount of highly volatile Cr contained therein can be overcome. Because of being free from Fe, Ti, Co or Ni, furthermore, the sintered body for thermistor devices according to the invention makes it possible to solve such problems as the excessively large initial electrical resistance in a temperature range of 100° C. or 150° C. or the excessively large constant B. As a result, a favorable temperature detection performance can be established over a wide temperature range from low temperature of around 100° C. or lower than 100° C. to high temperature of 900° C.

Now, examples of the embodiments of the invention will be illustrated by reference to drawings.

To produce the sintered body for thermistor devices according to the invention, materials for the sintered body for thermistor devices are first weighed and collected to give a definite composition ratio. As the materials for the sintered body for thermistor devices, oxides, hydroxides, carbonates and the like of the above-described elements constituting the sintered body for thermistor devices may be cited. Among all, oxides and carbonates are preferable. The materials of individual elements thus collected are wet mixed together in a pot mill for 5 to 30 hours and dried to give a powder. The average particle diameter of the powder of these materials preferably ranges from 0.5 to 2.0 µm. To further uniformly disperse the powder of the materials, it is still preferable that the particle diameter thereof ranges from 0.5 to 1.5 µm. As the materials for the sintered body for thermistor devices, use can be also made of sulfates and nitrates of the above-described elements. In this case, it is also possible to employ a method wherein the materials are dissolved and mixed in water, heated, polymerized and dried to give a powder.

Subsequently, the mixture powder obtained by mixing the definite elements as described above is calcined in the atmospheric air at 1100 to 1500° C. for 1 to 10 hours. To the calcined powder thus obtained, a sintering aid is added, if desired, followed by wet grinding and drying. As examples of the sintering aid, $SiO_2$, $CaSiO_3$, etc. may be cited. Among all, $SiO_2$ is an appropriate sintering aid. The sintering aid is added usually in an amount of from 0.3 to 10% by mass based on the calcined powder as described above.

Next, a binder is added, if desired, to the powder (the powder for sintered body for thermistor devices) having been obtained by wet grinding and drying. The resultant mixture is dried and granulated to give particles for molding. It is preferable that the average diameter of the obtained particles is 500 µm at the largest.

As examples of the binder which is employed if desired, binders comprising as the main component polyvinyl alcohol, polyvinyl butyral, etc. may be cited. Although the amount of the binder used herein is not particularly restricted, it ranges from 5 to 20 parts by mass, preferably from 10 to 20 parts by mass, per 100 parts by mass of the powder for sintered body for thermistor devices.

The particles for molding thus obtained are press molded and then the resultant molded article is sintered to thereby give a sintered body for thermistor devices. Although the sintering conditions are not particularly restricted, the sintering temperature preferably ranges from 1400 to 1700° C., still preferably from 1400 to 1600° C., while the sintering time preferably ranges from 1 to 5 hours, still preferably from 1 to 2 hours. The sintering is usually carried out in the atmospheric air, though the sintering atmosphere is not restricted too.

In the case of forming a thermistor device by using the molded article as described above, the molding is carried out by press molding with the use of a pair of electrode leads made of a Pt—Rh alloy. By sintering the thus integrated molded article, the thermistor device 2 as shown in FIG. 1 can be obtained.

In this thermistor device 2, a pair of electrode leads 9 is embedded in a sintered body for thermistor devices and at least one end of each electrode lead 9 is drawn out to take an output signal. The sintered body for thermistor devices 1 is shaped in such a manner so as to give a hexagonal cross section cut in the parallel direction to the drawing axis of the leads 9. The shape of th sintered body for thermistor devices constituting the thermistor device is not particularly restricted and it may be shaped into a disk. The pair of electrode leads may be drawn out from the sintered body for thermistor devices not only in one terminal side but also in both terminal sides.

After sintering as described above, the sintered body for thermistor devices and the thermistor device may be subjected to a heat treatment, if necessary. Concerning the conditions for this heat treatment, the treating temperature ranges from 800 to 1100° C., preferably from 850 to 1100° C. and still preferably from 900 to 1100° C., while the treating time is 30 hours or longer, preferably 100 hours or longer and still preferably 200 hours or longer. By heating at the above temperature for the above period of time, the resistance temperature properties of the sintered body for thermistor devices can be further stabilized. The heat treatment may be carried out either in the atmospheric air or some special atmosphere else.

Figure 2:
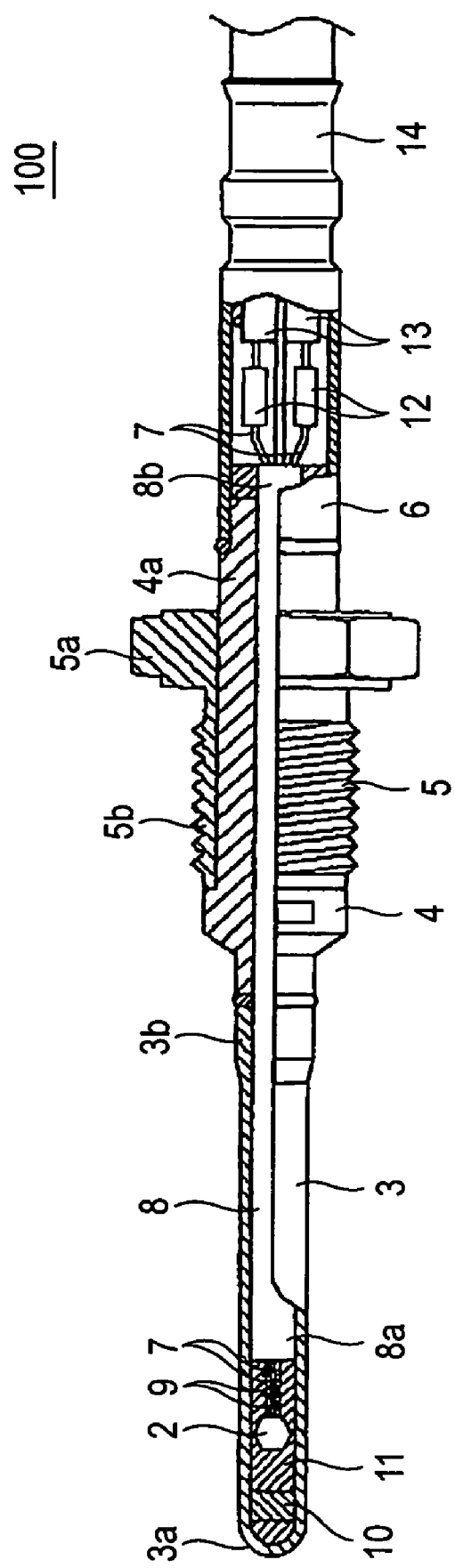
FIG. 2 is a partially cutaway side view showing the structure of a temperature sensor provided with a thermistor device having the sintered body for thermistor devices according to the invention.

Next, a temperature sensor using a thermistor device 2 comprising the above-described sintered body for thermistor devices 1 will be illustrated by reference to FIG. 2. FIG. 2 is a partially cutaway side view showing the structure of a temperature sensor 100 for detecting an exhaust gas temperature which is located in an exhaust gas channel in an automobile.

In this temperature sensor 100, the thermistor device 2 is enclosed in a bottomed metal tube 3 made of SUS310S. This metal tube 3 is closed in the top end side 3a and opened at the back end side 3b. In the back end side 3b of the metal tube 3, a flange 4 made of SUS310S is argon-welded. On the flange 4, a nut 5 having a hexagonal nut part 5a and a screw part 5b is rotatably provided. In the back end side 4a of the flange, a tubular joint 6 made of SUS304 is argon-welded.

In the metal tube 3, the flange 4 and the joint 6, a sheath 8 having a pair of core wires 7 enclosed therein is provided. This sheath 8 comprises an outer metal tube made of SUS310S, a pair of conductive core wires 7 made of SUS310S and an insulating powder whereby the outer tube is insulated from each of the sheath core wires 7 and the sheath core wires 7 are sustained. In the metal tube 3, the electron leads 9 of the thermistor device 2 are welded respectively to the sheath core wires 7 projecting toward the top end side 8a of the sheath. A pellet made of nickel oxide is provided within the top end side 3a of the metal tube 3.

Around the thermistor device 2, cement 11 is packed in. A pair of leads 13 is connected, via swagging members 12, to the sheath core wires 7 projecting toward the back end side 8b of the sheath in the joint 6. These leads 13 are enclosed in a heat-resistant rubber auxiliary ring 14. The sheath core wires 7 are connected to the leads 13 via the swagging members 12.

EXAMPLES

The invention will be described in greater detail by reference to the following Examples.

[Production of Thermistor Device]

Examples 1 to 15 and Comparative Example 1

A $Y_2O_3$ powder (purity 99.9% or more, average particle diameter 1.1 μm), a $Ca_2CO_3$ powder (purity 99.0% or more, average particle diameter 0.5 μm), an $MnO_2$ powder (purity 99.0% or more, average particle diameter 1.2 μm) and an $Al_2O_3$ powder (purity 99.5% or more, average particle diameter 0.6 μm) were weighed to give each composition ratio (mol) of a, b and c in the formula $(Y_{1-a}Ca_a)(Mn_bAl_c)O_3$ as listed in Table 1 followed by wet-mixing. After drying, the mixture was calcined in the atmospheric air at 1200° C. for 2 hours. In Example 1, part by mass of a sintering aid (an $SiO_2$ powder, purity 99.0% or more, average particle diameter 1.5 μm) was added per 100 parts by mass of the calcined powder. In Examples 2 to 15 and Comparative Example 1, no $SiO_2$ powder was added. Then each powder was wet-ground and dried to prepare a powder for sintered body for thermistor devices.

TABLE 1

| | Y (1-a) | Ca (a) | Mn (b) | Al (c) | Sintering aid (% by mass) |
|---|---|---|---|---|---|
| Ex. 1 | 0.820 | 0.180 | 0.180 | 0.820 | 1 |
| Ex. 2 | 0.820 | 0.180 | 0.180 | 0.820 | — |
| Ex. 3 | 0.820 | 0.180 | 0.194 | 0.806 | — |
| Ex. 4 | 0.820 | 0.180 | 0.206 | 0.794 | — |
| Ex. 5 | 0.820 | 0.180 | 0.219 | 0.781 | — |
| Ex. 6 | 0.806 | 0.194 | 0.194 | 0.806 | — |
| Ex. 7 | 0.794 | 0.206 | 0.206 | 0.794 | — |
| Ex. 8 | 0.781 | 0.219 | 0.219 | 0.781 | — |
| Ex. 9 | 0.840 | 0.160 | 0.180 | 0.820 | — |
| Ex. 10 | 0.840 | 0.160 | 0.194 | 0.806 | — |
| Ex. 11 | 0.840 | 0.160 | 0.206 | 0.794 | — |
| Ex. 12 | 0.840 | 0.160 | 0.219 | 0.781 | — |
| Ex. 13 | 0.940 | 0.060 | 0.180 | 0.820 | — |
| Ex. 14 | 0.940 | 0.060 | 0.219 | 0.781 | — |
| Ex. 15 | 0.960 | 0.040 | 0.180 | 0.820 | — |
| C. Ex. 1 | 1.000 | — | 0.180 | 0.820 | — |

Next, 20 parts by mass of a binder comprising polyvinyl alcohol as the main component was added to 100 parts by mass of the powder for sintered body for thermistor devices thus prepared. After mixing, drying and granulating, particles for molding (average particle diameter from 106 to 355 μm) were obtained. Using the obtained particles and a pair of electrode leads, a hexagonal molded article was then obtained by press molding. This molded article was sintered at 1550° C. for 1 hour. Thus, a thermistor-device shown by FIG. 1 having a thickness of 1.24 mm was produced.

Example 16

An $Sm_2O_3$ powder (purity 99.9% or more, average particle diameter 1.3 μm), an $SrCO_3$ powder (purity 99.0% or more, average particle diameter 0.5 μm), an $MnO_2$ powder purity 99.0% or more, average particle diameter 1.2 μm) and an $Al_2O_3$ powder (purity 99.5% or more, average particle diameter 0.6 μm) were weighed to give the composition ratio (mol) of a, b and c in the formula $(Sm_{1-a}Sr_a)(Mn_bAl_c)O_3$ as listed in Table 2 followed by wet-mixing. After drying, the mixture was calcined in the atmospheric air at 1400° C. for 2 hours. Next, 1 part by mass of a sintering aid (an $SiO_2$ powder, purity 99.0% or more, average particle diameter 1.5 μm) was added per 100 parts by mass of the calcined powder. Then the powder was wet-ground and dried to prepare a powder for sintered body for thermistor devices. Subsequently, a molded article was produced and sintered as in Example 1 to give a thermistor device.

Examples 17 to 19

A $Y_2O_3$ powder (purity 99.9% or more, average particle diameter 1.1 μm), an $SrCO_3$ powder (purity 99.0% or more, average particle diameter 0.5 μm), an $MnO_2$ powder (purity 99.0% or more, average particle diameter 1.2 μm) and an $Al_2O_3$ powder (purity 99.5% or more, average particle diameter 0.6 μm) were weighed to give each composition ratio (mol) of a, b and c in the formula $(Y_{1-a}Sr_a)(Mn_bAl_c)O_3$ as listed in Table 2 followed by wet-mixing. In Example 17, calcination was carried out and, after adding a sintering aid (an $SiO_2$ powder), a powder for wintered body for thermistor devices was prepared and a molded article was produced and sintered as in Example 16 to give a thermistor device. In Examples 18 and 19, on the other hand, wet-drying was carried out and then calcination was performed as in Example 16 followed by wet grinding and drying without adding any $SiO_2$ powder to thereby give a powder for sintered body for thermistor devices. Next, a molded article was produced as in Example 1 and sintered at 1500° C. for 1 hour to give a thermistor device shown by FIG. 1 having a thickness of 1.24 mm.

Example 20

An $Nd_2O_3$ powder (purity 99.9% or more, average particle diameter 1.5 μm), an $SrCO_3$ powder (purity 99.0% or more, average particle diameter 0.5 μm), an $MnO_2$ powder (purity 99.0% or more, average particle diameter 1.2 μm) and an $Al_2O_3$ powder (purity 99.5% or more, average particle diameter 0.6 μm) were weighed to give the composition ratio (mol) of a, b and c in the formula $(Nd_{1-a}Sr_a)(Mn_bAl_c)O_3$ as listed in Table 2 followed by wet-mixing. After drying, the mixture was calcined and a sintering aid (an $SiO_2$ powder) was added. Then a powder for sintered body for thermistor devices was prepared and a molded article was produced and sintered as in Example 16 to give a thermistor device.

Example 21

A $Gd_2O_3$ powder (purity 99.9% or more, average particle diameter 1.3 μm), an $SrCO_3$ powder (purity 99.0% or more, average particle diameter 0.5 μm), an $MnO_2$ powder (purity 99.0% or more, average particle diameter 1.2 μm) and an $Al_2O_3$ powder (purity 99.5% or more, average particle diameter 0.6 μm) were weighed to give the composition ratio (mol) of a, b and c in the formula $(Gd_{1-a}Sr_a)(Mn_bAl_c)O_3$ as listed in Table 2 followed by wet-mixing. After drying, the mixture was calcined and a sintering aid (an $SiO_2$ powder) was added. Then a powder for sintered body for thermistor devices was prepared and a molded article was produced and sintered as in Example 16 to give a thermistor device.

Example 22

A $Y_2O_3$ powder (purity 99.9% or more, average particle diameter 1.1 μm), an MgO powder (purity 99.0% or more, average particle diameter 1.0 μm) obtained by heating $4MgCO_3 \cdot Mg(OH)_2 \cdot 5H_2O$ at 1000° C., an $MnO_2$ powder (purity 99.0% or more, average particle diameter 1.2 μm) and an $Al_2O_3$ powder (purity 99.5% or more, average particle diameter 0.6 μm) were weighed to give the composition ratio (mol) of a, b and c in the formula $(Y_{1-a}Mg_a)(Mn_bAl_c)O_3$ as listed in Table 2 followed by wet-mixing. After drying, the mixture was calcined and a sintering aid (an $SiO_2$ powder) was added. Then a powder for sintered body for thermistor devices was prepared and a molded article was produced and sintered as in Example 1 to give a thermistor device.

Example 23

A $Y_2O_3$ powder (purity 99.9% or more, average particle diameter 1.1 μm), a $BaCO_3$ powder (purity 99.0% or more, average particle diameter 0.5 μm), an $MnO_2$ powder (purity 99.0% or more, average particle diameter 1.2 μm) and an $Al_2O_3$ powder (purity 99.5% or more, average particle diameter 0.6 μm) were weighed to give the composition ratio (mol) of a, b and c in the formula $(Y_{1-a}Ba_a)(Mn_bAl_c)O_3$ as listed in Table 2 followed by wet-mixing. After drying, the mixture was calcined and a sintering aid (an $SiO_2$ powder) was added. Then a powder for sintered body for thermistor devices was prepared and a molded article was produced and sintered as in Example 1 to give a thermistor device.

TABLE 3

|  | Y (1-a) | Sr (a) | Cr (1-b-c) | Fe (b) | Ti (c) | Sintering aid (% by mass) |
|---|---|---|---|---|---|---|
| C. Ex. 2 | 0.930 | 0.070 | 0.731 | 0.219 | 0.050 | 1 |
| C. Ex. 3 | 0.919 | 0.081 | 0.731 | 0.219 | 0.050 | 1 |
| C. Ex. 4 | 0.909 | 0.091 | 0.731 | 0.219 | 0.050 | 1 |

Comparative Example 5

A $Y_2O_3$ powder (purity 99.9% or more, average particle diameter 1.1 μm), an $SrCO_3$ powder (purity 99.0% or more, average particle diameter 0.5 μm), an $MnO_2$ powder (purity 99.0% or more, average particle diameter 1.2 μm), an $Al_2O_3$ powder (purity 99.5% or more, average particle diameter 0.6 μm) and an $Fe_2O_3$ powder (purity 99.4% or more, average particle diameter 0.9 μm) were weighed to give the composition ratio (mol) of a, b and c in the formula $(Y_{1-a}Sr_a)(Fe_{1-b-c}Mn_bAl_c)O_3$ as listed in table 4 followed by wet-mixing. After calcining as in Example 16, the mixture was wet-ground and dried without adding any SiO powder to give a powder for sintered body for thermistor devices. Next, a molded article was produced as Example 1 and sintered at 1500° C. for 1 hour to give a thermistor device shown by FIG. 1 having a thickness of 1.24 mm.

TABLE 4

|  | Y(1-a) | Sr (a) | Fe (1-b-c) | Mn (b) | Al (c) | Sintering aid (% by mass) |
|---|---|---|---|---|---|---|
| C. Ex. 5 | 0.960 | 0.040 | 0.069 | 0.137 | 0.794 | — |

TABLE 2

|  | Y (1-a) | Sm (1-a) | Nd (1-a) | Gd (1-a) | Sr (a) | Mg (a) | Ba (a) | Mn (b) | Al (c) | Sintering aid (% by mass) |
|---|---|---|---|---|---|---|---|---|---|---|
| Ex. 16 | — | 0.820 | — | — | 0.180 | — | — | 0.180 | 0.820 | 1 |
| Ex. 17 | 0.940 | — | — | — | 0.060 | — | — | 0.180 | 0.820 | 1 |
| Ex. 18 | 0.940 | — | — | — | 0.060 | — | — | 0.145 | 0.855 | — |
| Ex. 19 | 0.940 | — | — | — | 0.040 | — | — | 0.254 | 0.746 | — |
| Ex. 20 | — | — | 0.820 | — | 0.180 | — | — | 0.180 | 0.820 | — |
| Ex. 21 | — | — | — | 0.820 | 0.180 | — | — | 0.180 | 0.820 | 1 |
| Ex. 22 | 0.820 | — | — | — | — | 0.180 | — | 0.180 | 0.820 | 1 |
| Ex. 23 | 0.820 | — | — | — | — | — | 0.180 | 0.180 | 0.820 | — |

Comparative Examples 2 to 4

A $Y_2O_3$ powder (purity 99.9% or more, average particle diameter 1.1 μm), an $Cr_2O_3$ powder (purity 99.3% or more, average particle diameter 0.5 μm), an $Fe_2O_3$ powder (purity 99.4% or more, average particle diameter 0.9 μm) and an $TiO_2$ powder (purity 99.0% or more, average particle diameter 1.8 μm) were weighed to give each composition ratio (mol) of a, b and c in the formula $(Y_{1-a}Sr_a)(Cr_{1-b-c}Fe_bTi_c)O_3$ as listed in Table 3 followed by wet-mixing. After drying, the mixture was calcined and a sintering aid (an $SiO_2$ powder) was added. Then a powder for sintered body for thermistor devices was prepared and a molded article was produced and sintered as in Example 16 to give a thermistor device.

[Evaluation]

(1) Heating Resistance

The electrical resistance (initial electrical resistance, expressed in: kΩ) of each of the thermistor devices obtained in Examples 1 to 23 and Comparative Examples 1 to 5 was measured at each temperature as shown in Table 5. Next, each of these sintered body for thermistor devices was continuously heated at 1000° C. for 150 hours and then its electrical resistance (electrical resistance after heating, expressed in: kΩ) was measured at each temperature as shown in Table 6. Thus, a change (expressed in: ° C.) in electrical resistance compared with the initial electrical resistance was determined in accordance with the following formula (3). As will be described hereinafter, no detection could be performed at 300° C. or lower in the cases of the thermistor devices of Comparative Examples 2 and 5, since these thermistor devices showed very high initial electrical resistances at 100° C. and 150° C. Therefore, the electrical resistances after heating and the changes in electrical resistance as described above were not measured in these cases.

$$\text{Change in electrical resistances in terms of temperature} = 1/[\ln(\text{electrical resistances after heating}/\text{initial electrical resistance})/B + 1/T]] - T \quad (3)$$

T represents an absolute temperature (expressed in: K).

B represents a constant B (K). This constant B was calculated in accordance with the following formula (4) using two initial electrical resistances at temperatures closest to each other among the measurement temperatures of each of Examples and Comparative Examples as listed in Table 5. In Example 1, for example, the constant B between −40° C. and 0° C., the constant B between 0° C. and 100° C. the constant B between 100° C. and 300° C., the constant B between 300° C. and 600° C., and the constant B between 600° C. and 900° C. were respectively calculated.

$$\text{Constant } B = \ln((R/R_0)/(1/T - 1/T_0)) \quad (4)$$

R (kΩ) represents the initial electrical resistance at an absolute temperature T (K).

$R_0$ (kΩ) represents the initial electrical resistance at an absolute temperature $T_0$ (K), provided that the absolute temperature T is higher than $T_0$.

Table 5 shows the initial electrical resistances, Table 6 shows the electrical resistances after heating, and Table 7 shows changes in electrical resistance.

TABLE 5

|  | −40° C. | 0° C. | 100° C. | 150° C. | 300° C. | 600° C. | 900° C. |
|---|---|---|---|---|---|---|---|
| Ex. 1 | 89.54 | 28.03 | 4.033 |  | 0.530 | 0.127 | 0.059 |
| Ex. 2 |  |  | 303.6 |  | 0.107 | 0.704 | 0.186 |
| Ex. 3 |  | 421.4 | 38.77 |  | 2.492 | 0.314 | 0.103 |
| Ex. 4 |  | 440.3 | 37.35 |  | 2.092 | 0.241 | 0.078 |
| Ex. 5 |  | 329.8 | 25.15 |  | 1.262 | 0.147 | 0.050 |
| Ex. 6 |  | 187.5 | 20.63 |  | 1.751 | 0.269 | 0.095 |
| Ex. 7 |  | 168.4 | 16.94 |  | 1.281 | 0.187 | 0.067 |
| Ex. 8 | 316.1 | 88.57 | 9.625 |  | 0.781 | 0.128 | 0.051 |
| Ex. 9 |  |  | 189.7 |  | 6.490 | 0.518 | 0.139 |
| Ex. 10 |  |  | 125.4 |  | 4.424 | 0.383 | 0.109 |
| Ex. 11 |  |  | 212.7 |  | 4.764 | 0.314 | 0.081 |
| Ex. 12 |  |  | 73.05 |  | 2.226 | 0.187 | 0.055 |
| Ex. 13 |  |  | 1703 | 359.9 | 17.29 | 0.800 | 0.182 |
| Ex. 14 |  |  | 512.4 | 112.6 | 5.833 | 0.320 | 0.082 |
| Ex. 15 |  |  | 1985 | 434.7 | 22.40 | 1.104 | 0.251 |
| Ex. 16 |  |  | 222.9 |  | 4.272 | 0.297 | 0.085 |
| Ex. 17 |  |  | 103.0 |  | 5.348 | 0.630 | 0.195 |
| Ex. 18 |  |  | 31.26 |  | 1.858 | 0.270 | 0.101 |
| Ex. 19 |  | 93.52 | 5.474 |  | 0.366 | 0.061 | 0.023 |
| Ex. 20 |  |  | 151.5 |  | 3.944 | 0.304 | 0.087 |
| Ex. 21 |  |  | 142.6 |  | 5.059 | 0.500 | 0.143 |
| Ex. 22 |  | 147.0 | 9.123 |  | 0.645 | 0.107 | 0.045 |
| Ex. 23 |  |  | 38.20 |  | 3.303 | 0.515 | 0.096 |
| C. Ex. 1 |  |  | 909.7 | 235.2 | 16.75 | 1.108 | 0.256 |
| C. Ex. 2 |  |  | 122679 | 9050 | 97.49 | 1.004 | 0.075 |
| C. Ex. 3 |  |  | 178.8 |  | 3.747 | 0.220 | 0.039 |
| C. Ex. 4 |  |  | 44.58 |  | 0.931 | 0.080 | 0.023 |
| C. Ex. 5 |  |  | 12156 | 2050 | 63.43 | 2.12 | 0.388 |

TABLE 6

|  | −40° C. | 0° C. | 100° C. | 300° C. | 600° C. | 900° C. |
|---|---|---|---|---|---|---|
| Ex. 1 | 70.30 | 23.86 | 3.656 | 0.511 | 0.126 | 0.059 |
| Ex. 2 |  |  | 311.0 | 9.400 | 0.721 | 0.191 |
| Ex. 3 |  | 356.4 | 33.54 | 2.295 | 0.303 | 0.101 |
| Ex. 4 |  | 352.7 | 31.49 | 1.930 | 0.232 | 0.076 |
| Ex. 5 |  | 268.2 | 21.80 | 1.184 | 0.142 | 0.050 |
| Ex. 6 |  | 201.8 | 21.33 | 1.769 | 0.273 | 0.097 |
| Ex. 7 |  | 183.0 | 18.02 | 1.304 | 0.190 | 0.068 |
| Ex. 8 | 299.1 | 84.74 | 9.268 | 0.760 | 0.126 | 0.051 |
| Ex. 9 |  |  | 167.8 | 6/076 | 0.506 | 0.140 |
| Ex. 10 |  |  | 97.19 | 4.056 | 0.369 | 0.107 |
| Ex. 11 |  |  | 158.3 | 4.265 | 0.300 | 0.080 |
| Ex. 12 |  |  | 56.00 | 1.994 | 0.177 | 0.054 |
| Ex. 13 |  |  | 1735 | 17.51 | 0.814 | 0.186 |
| Ex. 14 |  |  | 471.0 | 5.827 | 0.322 | 0.082 |
| Ex. 15 |  |  | 1810 | 22.11 | 1.096 | 0.247 |
| Ex. 16 |  |  | 203.2 | 4.182 | 0.296 | 0.085 |
| Ex. 17 |  |  | 92.32 | 4.967 | 0.620 | 0.197 |
| Ex. 18 |  |  | 30.28 | 1.82 | 0.266 | 0.100 |
| Ex. 19 |  | 109.5 | 6.098 | 0.389 | 0.062 | 0.024 |
| Ex. 20 |  |  | 143.0 | 3.804 | 0.298 | 0.086 |
| Ex. 21 |  |  | 125.0 | 4.735 | 0.486 | 0.139 |
| Ex. 22 |  | 143.9 | 8.96 | 0.636 | 0.104 | 0.045 |
| Ex. 23 |  |  | 33.4 | 3.154 | 0.503 | 0.100 |
| C. Ex. 1 |  |  | 743.5 | 14.30 | 0.994 | 0.227 |
| C. Ex. 3 |  |  | 123.4 | 3.024 | 0.196 | 0.037 |
| C. Ex. 4 |  |  | 30.24 | 0.661 | 0.065 | 0.022 |

TABLE 7

|  | −40° C. | 0° C. | 100° C. | 300° C. | 600° C. | 900° C. |
|---|---|---|---|---|---|---|
| Ex. 1 | 7 | 7 | 7 | 5 | 1 | 1 |
| Ex. 2 |  |  | −1 | −2 | −4 | −8 |
| Ex. 3 |  | 5 | 8 | 9 | 8 | 6 |
| Ex. 4 |  | 7 | 10 | 9 | 8 | 8 |

TABLE 7-continued

|       | −40° C. | 0° C. | 100° C. | 300° C. | 600° C. | 900° C. |
|-------|---------|-------|---------|---------|---------|---------|
| Ex. 5 |         | 6     | 8       | 7       | 7       | 3       |
| Ex. 6 |         | −2    | −2      | −1      | −3      | −9      |
| Ex. 7 |         | −3    | −3      | −2      | −3      | −8      |
| Ex. 8 | 1       | 2     | 2       | 3       | 4       | 3       |
| Ex. 9 |         |       | 5       | 6       | 4       | −2      |
| Ex. 10 |        |       | 10      | 8       | 7       | 5       |
| Ex. 11 |        |       | 10      | 9       | 8       | 3       |
| Ex. 12 |        |       | 10      | 10      | 10      | 6       |
| Ex. 13 |        |       | −1      | −1      | −3      | −6      |
| Ex. 14 |        |       | 2       | 0       | −1      | 0       |
| Ex. 15 |        |       | 3       | 1       | 1       | 4       |
| Ex. 16 |        |       | 3       | 2       | 1       | 1       |
| Ex. 17 |        |       | 5       | 8       | 3       | −3      |
| Ex. 18 |        |       | 1       | 2       | 4       | 5       |
| Ex. 19 |        | −4    | −5      | −7      | −4      | −6      |
| Ex. 20 |        |       | 2       | 3       | 3       | 5       |
| Ex. 21 |        |       | 5       | 6       | 6       | 8       |
| Ex. 22 |        | 1     | 1       | 2       | 6       | 5       |
| Ex. 23 |        |       | 7       | 6       | 6       | −9      |
| C. Ex. 1 |      |       | 7       | 12      | 19      | 34      |
| C. Ex. 3 |      |       | 13      | 18      | 19      | 14      |
| C. Ex. 4 |      |       | 14      | 29      | 40      | 10      |

Tables 5 to 7 indicate that small changes in electrical resistance to the heat profile, i.e., ±10° C. over the whole temperature range are observed in Examples 1 to 23. Also, it can be understood that the thermistor devices of Examples 2 and 9 to 15 have properties enabling the detection of temperatures of from about 100° C. to 900° C., those of Examples 3 to 7 have properties enabling the detection of temperatures of from about 0° C. to 900° C., and those of Examples 1 and 8 have properties enabling the detection of temperatures of from about −40° C. to 900° C. It can be also understood that the thermistor devices of Examples 16 to 18, 20, 21 and 23 make it possible to detect temperatures of from 100 to 900° C. and remain stable to the heat profile. Further, it can be understood that the thermistor devices of Examples 19 and 22 make it possible to detect temperatures of from 0 to 900° C. and remain stable to the heat profile.

In contrast thereto, it can be understood that the thermistor devices of Comparative Examples 1, 3 and 4 have properties enabling the detection of temperatures of from 150 to 900° C. but show extremely large changes in electrical resistance as shown in Table 7. It can be also understood that the thermistor devices of Comparative Examples 2 and 5 have large initial electrical resistances at 100° C. and 150° C. and, therefore, temperatures of 300° C. or lower cannot be detected thereby.

(2) Evaluation on Scattering in Constant B

To evaluate scatterings in constant B (K) among individuals in Example 6, thermistor devices of 6 lots (Examples 6-1, 6-2, 6-3, 6-4, 6-5 and 6-6) were produced (each lot having 50 thermistor devices). Then the initial electrical resistances (kΩ) at 0° C. and 900° C. of 50 thermistor devices of each lot were measured. Using these initial electrical resistances, B0–900's (i.e., constants B between 0° C. and 900° C.) were calculated in accordance with the above-described formula (4). Next, the average constant B0–900 (K) was calculated and the average B0–900±3σ was further calculated. Then, the extent of scattering of ±3σ from the average B0–900 (scattering of the constant B) was determined in accordance with the following formula (5) for each sintering lot and putting the 6 sintering lots all together.

$$\text{Scattering in constant } B\ (\%) = \pm 3\sigma/\text{average } B0\text{--}900 \times 100 \quad (5)$$

Table 8 summarizes the results.

TABLE 8

|  | | In each lot | | | In 6 lots/among lots | |
|---|---|---|---|---|---|---|
|  | Sintering lot | B0-900 | ±3σ | Scatter in constant B | B0-900 | ±3σ | Scatter in constant B |
| Ex. 6-1 | 1 | 2700 | 17.7 | 0.65 | 2705 | 27.0 | 1.00 |
| Ex. 6-2 | 2 | 2712 | 11.9 | 0.44 | | | |
| Ex. 6-3 | 3 | 2701 | 22.1 | 0.82 | | | |
| Ex. 6-4 | 4 | 2698 | 14.3 | 0.53 | | | |
| Ex. 6-5 | 5 | 2705 | 23.9 | 0.88 | | | |
| Ex. 6-6 | 6 | 2709 | 19.5 | 0.72 | | | |

To evaluate scatterings in constant B in Comparative Example 2, thermistor devices of 6 lots (Comparative Examples 2-1, 2-2, 2-3, 2-4, 2-5 and 2-6) were produced (each lot having 50 thermistor devices). Then the electrical resistances (kΩ) at 300° C. and 900° C. of 50 thermistor devices of each lot were measured. Using these electrical resistances, the average constant B300–900 (K) ±3σ was calculated. Then, the extent of scattering of ±3σ from the average B300–900 (scattering of the constant B) was determined:in accordance with the above formula for each sintering lot and putting the 6 sintering lots all together. Table 9 summarizes the results.

TABLE 9

|  | | In each lot | | | In 6 lots/among lots | | |
|---|---|---|---|---|---|---|---|
|  | Sintering lot | B300-900 | ±3σ | Scatter in constant B | B300-900 | ±3σ | Scatter in constant B |
| C. Ex.2-1 | 1 | 7918 | 122.5 | 1.55 | 8010 | 398.6 | 4.98 |
| C. Ex.2-2 | 2 | 7956 | 202.3 | 2.54 | | | |
| C. Ex.2-3 | 3 | 7986 | 242.8 | 3,04 | | | |
| C. Ex.2-4 | 4 | 8052 | 127.4 | 1.58 | | | |
| C. Ex.2-5 | 5 | 8033 | 171.0 | 2.13 | | | |
| C. Ex.2-6 | 6 | 8093 | 204.0 | 2.51 | | | |

As Tables 8 and 9 show, Examples 6-1 to 6-6 show less scatterings in constant B, both for each sintering lot and putting the 6 sintering lots all together, than those in Comparative Examples 2-1 to 2-6.

This application in based on Japanese Patent application JP 2003-347601, filed Nov. 29, 2002, the entire content of which is heresy incorporated by reference, the same as if set forth at length.

What is claimed is:

1. A sintered body for thermistor devices comprising:
   at least one element selected from elements of group 3 in a periodic table excluding La; at least one element selected from elements of group 2 in a periodic table; Mn; Al; and oxygen, and being substantially free from any transition metal other than Mn and the at least one element selected from elements of group 3 in the periodic table and with the proviso that the sintered body does not contain La,
   wherein the at least one element selected from elements of group 3 in a periodic table excluding La is Y, Sc, Ce, Nd, Sm, Eu, Gd, Dy, Er or Yb and the at least one element selected from elements of group 2 in a periodic table is Ca, Sr, Mg or Ba.

2. The sintered body according to claim 1, which satisfies the following formulae (1) and (2):

$$0.02 \leq a < 1 \quad (1)$$

$$b+c=1 \quad (2)$$

provided that a content of the at least one element selected from elements of group 3 in a periodic table excluding La is referred to 1-a mol; a content of the at least one element selected from elements of group 2 in a periodic table is referred to as a mol; a content of Mn is referred to as b mol; and a content of Al is referred to as c mol.

3. The sintered body according to claim 2, wherein the content b of Mn satisfies the following formula $0.10 \leq b \leq 0.30$.

4. The sintered body according to claim 1, which contains Si element.

5. A thermistor device comprising the sintered body according to claim 1 and a pair of electrode leads which is embedded in the sintered body and at least one end of which is drawn out to take an output signal.

6. A temperature sensor using the thermistor device according to claim 5.

7. The sintered body according to claim 1, wherein the at least one element selected from elements of group 3 in a periodic table excluding La is Y, Nb, Sm or Gd, and the at least one element selected from elements of group 2 in a periodic table is Ca or Sr.

8. A thermistor device comprising a sintered body and a pair of electrode leads which is embedded in the sintered body and at least one end of which is drawn out to take an output signal, wherein the sintered body comprises:
   at least one element selected from elements of group 3 in a periodic table excluding La; at least one element selected from elements of group 2 in a periodic table; Mn; Al; and oxygen, and being substantially free from any transition metal other than Mn and the at least one element selected from elements of group 3 in the periodic table and with the proviso that the sintered body does not contain La,
   which sintered body satisfies the following formulae (1) and (2):

$$0.02 \leq a \leq 1 \quad (1)$$

$$b+c=1 \quad (2)$$

provided that a content of the at least one element selected from elements of group 3 in a periodic table excluding La is referred to 1-a mol; a content of the at least one element selected from elements of group 2 in a periodic table is referred to as a mol; a content of Mn is referred to as b mol; and a content of Al is referred to as c mol, and wherein the content b of Mn satisfies the following formula $0.10 \leq b \leq 0.30$,
   wherein the at least one element selected from elements of group 3 in a periodic table excluding La is Y, Sc, Ce, Nd, Sm, Eu, Gd, Dy, Er or Yb and the at least one element selected from elements of group 2 in a periodic table is Ca, Sr, Mg or Ba.

9. The thermistor device according to claim 8, wherein the at least one element selected from elements of group 3 in a periodic table excluding La is Y, Nb, Sm or Gd, and the at least one element selected from elements of group 2 in a periodic table is Ca or Sr.

* * * * *